United States Patent
Suer

Patent Number: 5,425,237
Date of Patent: Jun. 20, 1995

[54] COUNTERBALANCE SYSTEM

[75] Inventor: James D. Suer, Cincinnati, Ohio

[73] Assignee: Cincinnati Milacron Inc., Cincinnati, Ohio

[21] Appl. No.: 242,483

[22] Filed: May 13, 1994

[51] Int. Cl.⁶ .......................... F15B 1/04; G05B 11/01
[52] U.S. Cl. .......................................... 60/414; 60/711; 318/611; 318/625; 318/676
[58] Field of Search ................. 60/372, 414, 711, 716; 92/130 B, 130 C, 133; 318/611, 623, 625, 676, 38, 39, 98, 99; 91/390 R

[56] References Cited

U.S. PATENT DOCUMENTS

| | | | |
|---|---|---|---|
| 2,681,623 | 6/1954 | Kane | 92/130 B X |
| 2,761,317 | 9/1956 | Seagrave, Jr. | 318/676 X |
| 3,398,650 | 8/1968 | Garnjost . | |
| 3,657,630 | 4/1972 | Fiet | 318/676 |
| 3,752,189 | 8/1973 | Marr et al. | 318/676 X |
| 3,807,175 | 4/1974 | Kubik . | |
| 3,913,451 | 10/1975 | McDonald . | |
| 3,958,492 | 5/1976 | Curless . | |
| 4,098,491 | 7/1978 | Larralde | 91/390 X |
| 4,132,152 | 1/1979 | Hunkar et al. . | |
| 4,202,247 | 5/1980 | Hunkar et al. . | |
| 4,202,250 | 5/1980 | Zeuner et al. . | |
| 4,221,156 | 9/1980 | Zirps et al. . | |
| 4,455,838 | 6/1984 | Junichi et al. | 60/711 |
| 4,498,318 | 2/1985 | Mitter | 92/130 B X |
| 4,691,511 | 9/1987 | Dollison | 60/414 |
| 4,807,518 | 2/1989 | Berchtold et al. | 91/421 |
| 5,303,549 | 4/1994 | Berchtold et al. | 60/414 |

OTHER PUBLICATIONS

"Can an accumulator help you save hydraulic energy?", reprinted from the magazine of fluid power systems, Z. Zahid, Industrial Publishing Co., Copyright 1975.

"High Performance CNC Machining Center", Brochure from Cincinnati Milacron, Copyright 1990 Cincinnati Milacron Mkt. Co.

"Parts And Service Manual", Cincinnati Milcron Publication No. 23-MC-87151-1, Copyright 1987 Cincinnati Milacron Mkt. Co. Chapters 1, 2 and 6.

*Primary Examiner*—John E. Ryznic
*Attorney, Agent, or Firm*—Thomas M. Farrell

[57] ABSTRACT

A machine with a movable element, such as a machine tool and its spindle carrier, that is powered by a motive means to move the element is provided with a counterbalancing system having at least two counterforce means operably connected to the movable element for exerting a counterbalance force on the movable element in opposition to the first force and wherein a first one of the counterforce means has a controllable servomotor means. The control means controls the servomotor means so as to cause the counterbalancing system to exert a substantially constant counterbalance force on the movable element in opposition to the first force. The second one of the counterforce means may be a hydraulic means having a hydraulic cylinder operably connected to an accumulator and a hydraulic piston operably disposed in the cylinder and connected to the movable element. The control means has a load sensor to sense a load on the movable element and convert the sensed load into a signal used to control the servomotor means which may be a torque controlled electric servomotor for controlling the vertical travel of a spindle carrier in machine tool.

15 Claims, 1 Drawing Sheet

COUNTERBALANCE SYSTEM

FIELD OF THE INVENTION

In general, this invention relates to a counterbalance system for a vertically movable element of a machine tool and, more particularly, to a counterbalance system for the vertically movable spindle carrier of a machine tool having a two-part counterbalance system comprising the combination of a piston and hydraulic part which has an accumulator and a torque controlled servomotor part.

BACKGROUND OF THE INVENTION

While the counterbalance system of the present invention is applicable to many types of vertical movable means, it is particularly well adapted as a counterbalance mechanism for the vertically movable spindle carrier of a machine tool such as a numerically-controlled machining center, or the like. As a consequence for purposes of any exemplary embodiment, the counterbalance system will be described in terms of its application to the spindle carrier of a machine tool.

In one of its most common forms, the spindle carrier of a machining center, or the like, is shiftable vertically upwardly and downwardly along ways by a ballscrew assembly operatively connected to the spindle carrier and actuated by a drive motor. A ball screw is typically mounted to the column of the machine tool and engages a ball nut attached to the spindle carrier. Since a spindle carrier can be extremely heavy, weighing 24,000 pounds or more, it is desirable to provide a counterbalance system for the spindle carrier to assist the drive motor in moving the spindle carrier. This also minimizes the compression of the ballscrew assembly and increases its life by reducing the mechanical stress within the material of the ball screw assembly. A numerically-controlled machine tool has a spindle carrier movable along a vertical or Y axis and which is typically powered by an electric drive motor or some other type of motor means. The spindle carrier is movable along vertical ways of the machine tool and is connected to the electric drive motor through a relatively long axially-fixed ballscrew having a length such as one hundred inches, for example. The spindle carrier may weigh 24,000 pounds, for example, thus placing a relatively large load on the ballscrew. This load can stretch and/or compress the ballscrew, which is mounted to a ball nut that may travel the length of the ballscrew, and thus interfere with the operation and degrade the accuracy of the machine tool.

To minimize the stretch or compression of the ballscrew, and to assist the drive motor in moving the spindle carrier, a counterbalance mechanism is used with the spindle carrier. U.S. Pat. No. 4,807,518 describes one such prior counterbalance mechanism which has the spindle carrier attached to one end of a chain which is threaded around sprockets and secured at its other end to a fixed structure. The other end of the chain is attached to a piston rod of a piston slidable within a hydraulic cylinder. By applying hydraulic fluid under pressure to the end of the piston attached to the piston rod, a counterbalance force is applied to the spindle carrier. This counterbalance mechanism enables the spindle carrier to be more easily moved by the electric drive motor. However, the inventor's of U.S. Pat. No. 4,807,518 found that when the spindle carrier was moved downwardly by the electric drive motor, the upward movement of the piston within the cylinder caused an increase in the hydraulic pressure causing compression of the ballscrew and when the spindle carrier was moved upwardly by the electric drive motor, the downward movement of the piston in the hydraulic cylinder caused a decrease in the hydraulic pressure thereby producing tension in the ballscrew. With a typical ballscrew having a length of about one hundred inches, extension or contraction of the ballscrew due to such tension or compression respectively can substantially affect the position to which the spindle carrier is moved by the electric drive motor. The relative force locations within a horizontal plane through the carrier (i.e. the ball screw force), the counterbalance force, the slideway bearing friction force, and the force of the carrier's center of gravity, could result in a moment which will change during the transition from upward to downward carrier motion. This changing moment causes the carrier to rotate or rock depending upon the magnitude of the moment and the compliance of the slideway bearing supporting the carrier. This phenomena will substantially influence the positioning accuracy or lost motion at the machine's tool tip. If it wasn't for this changing moment, a servo slide feedback system could solve the resulting positioning problem. Thus, accurate and precise positioning of the spindle carrier, typically within 0.0005" for example, cannot easily be obtained, if at all. This counterbalance system also has deadband problems at spindle carrier reversal.

Thus the inventor's of U.S. Pat. No. 4,807,518, citing these reasons as well as others such as hydraulic and mechanical inefficiencies including the friction of the chain at the sprockets, movement of the spindle carrier along the ways, and the hydraulic piston sliding in the cylinder, proposed an apparatus which produces a substantially constant counterbalance force. Such an apparatus uses a load cell to produce a signal indicative of the sensed load on the spindle carrier and a control means which uses the signal to vary the hydraulic pressure applied to a piston within the hydraulic cylinder which provides the counterbalance force. The system of U.S. Pat. No. 4,807,518 has been used and has been found to substantially reduce and eliminate deadband problems at spindle carrier reversal and can compensate for the counterbalance valve and line pressure losses at high slide speeds or hydraulic flow rates, conditions which cause problems with traditional counterbalance systems not having load cell feedback.

A further improvement to this system included an accumulator for the hydraulic piston and cylinder provided a faster response and requires less hydraulic power to operate the system. This resulted in considerable savings in operating energy and expenses, reduced noise, and a requirement for a smaller pump and tank. An example of a machine tool is the High Performance CNC Machining center with ACRAMATIC 850MC Computer Numerical Control which has an accumulator as illustrated in its parts and service manual (1987) on page 2-1-3. Accumulator counterbalance systems, particularly these utilizing gas-charged accumulators are, however, characterized by varying counterbalance pressure or force, as the slide moves over its length of travel, particularly for large machines. As a consequence, the accumulator counterbalance system is most useful where the spindle carrier has a short vertical travel and is relatively lightweight. Under these circumstances, pressure or counterbalance force variations are often negligible or within acceptable limits.

The present invention is based upon the discovery that excellent results can be achieved through the use of a two-part system utilizing portions of the known cylinder and accumulator hydraulic system to provide the major counterbalancing force to a chain, together with a high speed torque controlled servomotor operatively attached to one of the chain sprockets to correct or compensate for any deficient counterbalance force of the accumulator hydraulic system.

SUMMARY OF THE INVENTION

The present invention is directed towards a machine with a movable element such as a machine tool and its spindle carrier that is powered by a motive means to move the element against a first force such as gravity. The present invention provides a counterbalance system with two counterforce means for exerting a counterbalancing force on the movable element in opposition to the first force wherein a first one of the counterforce means includes a controllable servomotor and a control means for controlling the servomotor to cause the counterbalance system to exert a substantially constant counterbalance force on the movable element in opposition to the first force.

One particular embodiment of the present invention provides a hydraulic counterforce means having a hydraulic cylinder operably connected to an accumulator and a hydraulic piston operably disposed in the cylinder and connected to the movable element. The control means includes a load sensor to sense a load on the movable element and convert the sensed load into a signal used to control the servomotor means which is preferably a torque controlled electric servomotor.

A more particular embodiment of the present invention provides a machine tool having a vertically movable spindle carrier and a motive means to move the spindle carrier vertically in either vertical direction with a two part counterbalance means having that includes two counterforce means operably connected to the spindle carrier for exerting a counterbalance force on said spindle carrier in only one vertical direction as the spindle carrier is moved in either vertical direction by the motive means. The first counterforce means has a servomotor and a control means for controlling the servomotor to cause the counterbalance system to exert a substantially constant counterbalance force on the spindle carrier in only one vertical direction irrespective of the direction of vertical movement of the spindle carrier. The second counterforce means is hydraulic and connected to the movable element, preferably by a chain and sprocket apparatus. The chain is connected to a piston rod attached to a piston disposed in a hydraulic cylinder which is hydraulically connected to an accumulator. The control means includes a load sensor to sense a load on the spindle carrier and convert the sensed load into a signal indicative of the load.

Another more particular embodiment provides a torque controlled electric servomotor and control means that further provides a motor current sensing feedback circuit connected to the servomotor, a first differential amplifier connected to an output line from the sensor and an output line from the feedback circuit, and a first proportional controller controllably connected to the servomotor and connected to an output line from the first differential amplifier.

By correcting the counterbalance force in this manner, rather than attempting to control the hydraulic counterbalance pressure, a number of advantages are obtained. The system of the present invention enables the accumulator approach to be used with heavier slides having longer travel, while still maintaining a constant counterbalance force, than was otherwise feasible with conventional designs. Another advantage is that less hydraulic power is required thus yielding savings in energy and operating expenses. Yet another advantage is that a smaller pump and tank unit may be used. A marked reduction in operating energy may be achieved, together with reduced noise and a reduced component part count. The setup procedure for the system of the present invention is less complicated than that of the prior art. The load cell feedback is also more easily interfaced with a commercially available torque controlled electric servomotor than the hydraulic systems of the prior art. The system of the present invention is also characterized by faster response and a substantially constant and correct counterbalance force across a greater range of spindle carrier speeds and positions as compared to more conventional and prior designs. Yet another advantage of the present invention is that it provides a counterbalance system that enables a hydraulic accumulator to be used with heavier slides having longer travel, while still maintaining a constant counterbalance force, than was otherwise feasible with more conventional and prior art designs.

DESCRIPTION OF THE INVENTION

Figure 1:
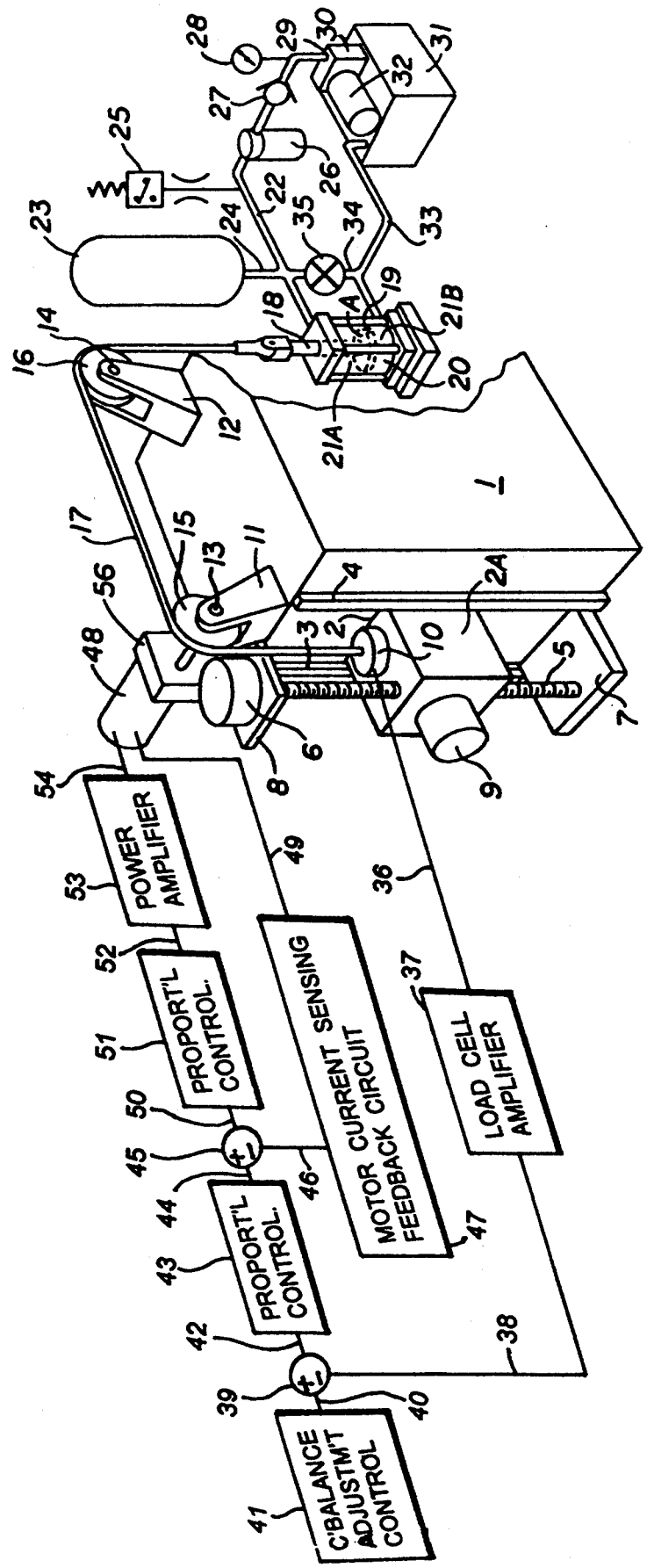
FIG. 1 is a diagrammatic perspective illustration of a machining center employing a counterbalance system in accordance with a preferred embodiment of the present invention.

The present invention is directed towards a machine with a movable element such as a machine tool and its spindle carrier that i s powered by a motive means to move the element against the force of gravity. The present invention provides a counterbalance system for exerting a counterbalancing force on the movable element in opposition to gravity.

Illustrated in FIG. 1 is a column 1 of a computer numerically controlled machine tool having vertical column ways 3 and 4 for the purpose guiding a spindle carrier slide 2 of a spindle carrier 2A. The spindle carrier 2A carries a rotary spindle 9 for supporting and driving a variety of tools. In order to move the spindle carrier 2A vertically, a ballscrew 5 and a ballscrew drive motor 6 are supported on vertically spaced apart brackets 7 and 8 which are mounted on the machine column 1 and the ballscrew engages a ball nut (not specifically shown) on the carrier in a manner well known in the industry. The machine column 1 is provided with a pair of supports 11 and 12 which rotatably support the shafts 13 and 14 of sprockets 15 and 16, respectively. The sprockets 15 and 16 engage and support a chain 17. One end of chain 17 is attached to a load cell 10. The other end of chain 17 is attached to a piston rod 18 of a piston 19 within a hydraulic cylinder 20 of the hydraulic counterbalance part of the counterbalance system of the present invention.

The hydraulic part further includes a hydraulic supply line 22 which connects an upper chamber 21A of the cylinder 20 to a pressure accumulator 23 via an intermediary line 24. A hydraulic return line 33 connects a lower chamber 21B of the cylinder 20 to a vacuum reservoir in the form of a tank 31. A safety pressure switch 25, for shutting down the machine, monitors the pressure in the supply line 22 on the pressure side of the hydraulic part of the counterbalance system and therefore in the accumulator 23 to which it is connected and with which it is in hydraulic pressure communication. A filter 26, a check valve 27, and a pressure gauge 28 are successively disposed in the first hydraulic supply line 22 between the accumulator 23 and an outlet 29 of a hydraulic pump 30 at the end of the supply line 22. The inlet (not shown) of pump 30 is connected to a reservoir or tank 31 containing hydraulic fluid and the pump 30 is powered by a pump motor 32.

The hydraulic part of the counterbalance system of the present invention contains a dump line 34 having an accumulator unload valve 35 disposed therein and operable to open at a preset pressure differential across the valve. This is for relieving overly high pressure differentials between the supply line 22, which operates at relatively high pressure levels, and the hydraulic return line 33, which operates at relatively low pressure levels. The functions of the various elements of the hydraulic portion of the counterbalance system will be apparent hereinafter. It will be understood by one skilled in the art that the various elements including the load cell 10, the accumulator 23, the pressure switch 25, the filter 26, the check valve 27, the gauge 28, the pump 30, the pump motor 32, and the accumulator unload valve 35 are, in and of themselves, individually well-known in the art and are commercially available.

The load cell 10 is attached to the spindle carrier 2A to sense the load thereon. One suitable example of a load cell appropriate for this purpose is a thin profile load cell sold by Sensotec of Columbus, Ohio under the designation Model No. 41, and having a capacity of 50,000 pounds. The load cell 10 has a strain gauge to sense the load, and converts the sensed load into an electrical signal proportional to the load on the spindle carrier 2A. The output signal 36 of load cell 10 is supplied to a load cell amplifier 37. One load cell amplifier suitable for this purpose is sold by Action Instruments Company, Inc. of San Diego, Calif., under the designation AP 4251-209. The output signal 38 of load cell amplifier 37 is connected to a first differential amplifier 39. The first differential amplifier 39 also receives an output signal 40 from a counterbalance adjustment control 41. The counterbalance adjustment control 41 is preferably a trim potentiometer movable to provide between zero volts (zero pounds) and 10 volts (representing a maximum load such as perhaps 50,000 pounds) to first differential amplifier 39.

The output 42 of first differential amplifier 39 is connected to a first proportional controller 43. The output signal 44 of proportional controller 43 is connected to a second differential amplifier 45. The second differential amplifier 45 also receives a signal 46 from a motor current sensing feedback circuit 47 which is connected to a preferably electric servomotor 48 as indicated by line 49. The second differential amplifier 45 has an output 50 connected to a second proportional controller 51. The second proportional controller 51 provides an output signal 52 to a power amplifier 53 which in turn controls the power to the servomotor 48 through an electrical power line 54. The second differential amplifier 45, motor current sensing feedback circuit 47, second proportional controller 51, and power amplifier 53 and associated circuitry are typically packaged as an electric motor controller such as a Brushless Motor Controller available from Kollmorgan Industrial Drives under the model designation of BDS4-210.

Preferably the servomotor 48 is a torque controlled permanent magnet servomotor. An exemplary appropriate motor for this purpose is available from Kollmorgan Industrial Drives under the designation of B-204-C (Brushless Servomotor). The servomotor 48 has an output shaft (not shown) which is drivingly connected to a planetary gear box 56. The planetary gear box 56 provides a mechanical advantage and has an Output shaft constituting the shaft 13 to which sprocket 15 is affixed. Planetary gear boxes are available from several sources, eg. Micron Instrument Corp., Bayside Controls Inc.

The apparatus of the counterbalance system of the present invention having been described in detail, the manner of its operation can now be set forth. As is well known, the position of the spindle carrier 2A and the spindle 9 is determined by the ballscrew 5 and ballscrew drive motor 6. In order to minimize stretch and compression of the ballscrew mechanism and rocking of the spindle carrier and to enable the ballscrew drive motor 6 to move the spindle carrier 2A with precision, the counterbalance system of the present invention is provided, and constitutes a two-part system.

One part of the system is the hydraulic counterbalance part utilizing the chain 17, the sprockets 15 and 16 and the cylinder 20 with its piston rod 18 and piston 19. When the spindle carrier 2A is shifted downwardly, chain 17 will cause the piston 19 to shift upwardly within the cylinder 20. Hydraulic fluid under pressure in the upper chamber 21A above the piston 19 will exit cylinder 20 via line 22. Since line 34 is blocked by normally closed accumulator unload valve 35, and since line 22 is also blocked by check valve 27, fluid from the upper chamber 21A can only enter accumulator 23 via line 24. As is well-known in the art, the accumulator 23 is provided with a transverse diaphragm (not shown) which is caused to expand upwardly within the accumulator by the entering hydraulic fluid. Simultaneously, gas (usually nitrogen) stored within the accumulator 23 above the diaphragm is compressed by this action. In this way, the bulk of the hydraulic energy within cylinder 20 is stored in the accumulator 23.

In a similar fashion, when the spindle carrier 2A is shifted upwardly by ballscrew 5 and ballscrew drive motor 6, the chain 17 will enable the piston 19 to shift downwardly within cylinder 20 due to gravity and the compressed gas within accumulator 23 acting upon the diaphragm therein and shifting the hydraulic fluid under pressure out of the accumulator and into the upper chamber 21A of the cylinder 20. This is the only part of the hydraulic circuit through which the hydraulic fluid can flow from the accumulator 23 because of the one way action and operation of the check valve 27 and the normally closed accumulator unload valve 35. While the piston 19 is down the accumulator pressure is at its minimum level. If this minimum accumulator pressure is lower than the pressure at the pump 28 then hydraulic flow through the check valve 27 from the pump to the accumulator 23 will occur until the accumulator and pump pressures are equal. This feature provides the hydraulic fluid necessary to replace the system's hydraulic fluid lost to leakage. Note that the peripheral surface of the piston (not shown) is provided with a seal that engages the inside surface of the cylinder. Any leakage past this seal will return to tank 31 via line 33.

The sole purpose of the pump 30, and the pump motor 32 is to maintain the proper fluid pressure within the system. Since this is the only purpose for these elements, the pump 30 and pump motor 32 can be considerably smaller than in the counterbalance system of the above-noted U.S. Pat. No. 4,807,518. The pressure switch 25 constitutes a safety device which shuts down the entire machine should the fluid pressure within the system fall below a predetermined point. The accumulator unload valve 35 may be opened when the system is down to drain hydraulic fluid from the accumulator 23 to the tank 31.

The hydraulic system thus far described serves as the primary counterforce means of the two-part counterbalance system of the present invention. However, the hydraulic part of the system is not, in and of itself, adequate to provide sufficiently precise counterbalancing of the spindle carrier 2A as desired by today's more demanding requirements, throughout its vertical travel upwardly or downwardly. In the hydraulic part of the system illustrated, as the spindle carrier 2A shifts upwardly, hydraulic fluid flows from the accumulator 23 into the upper chamber 21A of cylinder 20. By the same token, as the spindle carrier 2A slides downwardly, the piston rod 18 will shift upwardly within cylinder 20 and force hydraulic fluid under pressure into the accumulator 23. This system does not provide perfect counterbalancing because the pressure in the accumulator 23 varies as the spindle carrier 2A shifts upwardly and downwardly. Further inaccuracies are added because of hydraulic flow losses, ball screw nut and support bearing friction, friction in the sprockets 15 and 16, friction of the piston rod 18 moving within the cylinder 20 and friction of the spindle carrier slide 2 along ways 3 and 4.

As indicated above, correction of this problem could be approached from the standpoint of the hydraulic system itself, adding means to compensate for its lack of accuracy. This is the approach taken, for example, in the above-mentioned U.S. Pat. No. 4,807,518. Such an approach is complex, involves expensive valving, and would require a pump and pump motor larger than one needed with the present invention. The present invention takes advantage of the stored energy of a hydraulic counterbalancing system having an accumulator 23. The pump 30 is not required to supply counterbalancing energy. Rather, the pump is only required to make up for leakage of hydraulic fluid within the system.

The deficiencies of the hydraulic part of the system of the present invention are compensated by the small controlled servomotor 48 and the feedback of load cell 10. As a result, the potential energy of the spindle carrier 2A is stored in accumulator 23, rather than lost in an otherwise required relief valve at every move of the spindle carrier 2A. At the same time, the load cell feedback maintains the desired constant counterbalancing force.

It will be remembered that one end of chain 17 is connected to the load cell 10. The load cell senses the load on spindle carrier 2A and converts the sensed load into an electrical signal proportional to the load. The load cell amplifier 37 amplifies the signal of the load cell 10 which is directed to the first differential amplifier 39. The potentiometer of the counterbalance adjustment control 41 has its output signal 40 also directed to the first differential amplifier 39. To obtain ideal counterbalance of the spindle carrier's 2A weight, the counterbalance adjustment control potentiometer of the counterbalance adjustment control 41 is adjusted to yield zero torque at the output shaft (not shown) of drive motor 6. Drive motor 6 output torque can be observed by monitoring its armature current, zero armature current equals zero motor shaft torque. The output 42 of the first differential amplifier is supplied to the first proportional controller 43 which in turn sends an output signal 44 to the second differential amplifier 45 which is equivalent to the needed torque for servomotor 48 to assure the proper counterbalance force. A signal 46 is also fed to the second differential amplifier 45 from the motor current sensing feedback circuit 47 which measures the motor current in servomotor 48 and converts it to a low level analogue signal representing the motor torque. The second differential amplifier 45 compares the actual motor torque to the needed motor torque and outputs an appropriate signal to the second proportional controller 51. The output signal 52 of the second proportional controller 51 is fed to power amplifier 53 which, in response, properly controls the power to the servomotor 48 through the electrical power line 54.

From the above description, it will be evident that if the signal 38 from load cell amplifier 37 is less than the set point determined by counterbalance adjustment control 41, the torque servomotor 48 will be energized to rotate sprocket 15 in a clockwise direction (as viewed in FIG. 1) pulling upwardly on chain 17. If the signal 38 from load cell amplifier 37 is higher than the set point determined by counterbalance adjustment control 41, the torque motor will cause sprocket 15 to rotate in a counterclockwise direction. In this way, the electric servomotor 48 in conjunction with the load cell feedback, serves only to correct or compensate for the deficient counterbalance force of the hydraulic accumulator part of the counterbalance system.

EXAMPLE I

In a system of the type illustrated and described, the weight of the spindle support is 10,000 pounds and it has a vertical travel of 60 inches. The spindle carrier 2A has a rapid traverse rate of 600 ipm (inches per minute). The hydraulic part of the counterbalance system has a pressure of 2000 psi and the initial gas charge in the accumulator is 2000 psi.

Under the above circumstances, with a 10 gallon accumulator and a piston cross-sectional area of 4.43 square inches, the hydraulic counterbalance piston 19 will perfectly counterbalance the spindle carrier 2A at its lowest point of travel. At the uppermost limit of travel of the spindle carrier 2A, the hydraulic counterbalance piston 19 will fail to perfectly counterbalance spindle carrier 2A by 1,150 pounds. The cylinder pressure will be 2,260 psi and 2000 psi at the lowest and highest points of travel of the spindle carrier 2A, respectively. In order to compensate for the lack of counterbalance of the hydraulic part of the counterbalance system, the torque controlled servomotor 48 should have about a 1.75 horsepower capability.

EXAMPLE II

In an assembly of the type described and illustrated, the weight, travel and rapid traverse rate of the spindle carrier 2A is the same as that set forth in Example I. In this Example, the pressure in the hydraulic part of the counterbalance system is 3000 psi and the initial gas charge in the accumulator is also 3000 psi. In this instance, a 5 gallon accumulator is required along with a cylinder cross-sectional area of 2.84 square inches. In this Example, the maximum pressure will rise to 3,520 psi and the counterbalance will be 1,475 pounds less than is needed when the spindle carrier 2A is at its uppermost point of travel. In this embodiment, the torque controlled servomotor 48 must have a 2.2 horsepowers capability. It will be evident from this Example that increasing the system pressure will require a smaller accumulator 23, a smaller cylinder cross-sectional area and a torque controlled servomotor 48 having greater horsepower capability.

It would be within the scope of the invention to provide the piston rod 18 with a sprocket about which the chain 17 would pass, the end of the chain being anchored to a part of the machine tool preferably located at a vertical position equal to or greater than the vertical position of sprocket 16. Such amounting would enable the stroke of the piston 19 within the cylinder 20 to be less than that required by the embodiment illustrated.

While the invention has been shown in connection with a preferred embodiment, it is not the intention that the invention be so limited. Rather, the invention extends to all such designs and modifications as come within the scope of the appended claims.

What is claimed is:

1. A machine including:
   a movable element;
   a first motive means connected to said movable element to move said movable element against a first force;
   a counterbalancing system having at least two counterforce means operably connected to said movable element for exerting a counterbalance force on said movable element in opposition to said first force;
   a first one of said counterforce means including a servomotor means; and
   a control means for controlling said servomotor means to cause said counterbalancing system to exert a substantially constant counterbalance force on said movable element in opposition to said first force.

2. The machine according to claim 1 wherein a second one of said counterforce means is a hydraulic means connected to said movable element.

3. The machine according to claim 2 wherein said hydraulic means includes a hydraulic cylinder operably connected to an accumulator and a hydraulic piston operably disposed within said cylinder operably and connected to said movable element.

4. The machine according to claim 3 wherein said control means includes a loads sensor to sense a load on said movable element and convert the sensed load into a signal indicative of the load.

5. The machine according to claim 4 wherein said servomotor means is a torque controlled servomotor.

6. A machine tool including:
   a spindle carrier vertically movable against gravity;
   a motive means connected to said spindle carrier to move said spindle carrier vertically in either vertical direction;
   a counterbalancing system for exerting a counterbalance force on said spindle carrier in only one vertical direction as said spindle carrier is moved in either vertical direction by said motive means;
   said counterbalancing system having at least two counterforce means operably connected to said spindle carrier;
   a first one of said counterforce means including a servomotor means; and
   a control means for controlling said servomotor means to cause said counterbalancing system to exert a substantially constant counterbalance force on said spindle carrier in only said one vertical direction irrespective of the direction of vertical movement of said spindle carrier.

7. The machine tool according to claim 6 wherein a second one of said counterforce means is a hydraulic means connected to movable element and having a hydraulic cylinder operably connected to an accumulator and a hydraulic piston operably disposed within said cylinder operably and connected to said spindle carrier.

8. The machine tool according to claim 7 wherein said control means includes a load sensor to sense a load on said movable element and convert the sensed load into a signal indicative of the load.

9. The machine tool according to claim 8 wherein said servomotor means is a torque controlled electric servomotor.

10. The machine tool according to claim 9 wherein said control means further includes;
    a motor current sensing feedback circuit connected to said servomotor,
    a first differential amplifier in signal receiving relationship with said load sensor,
    said first differential amplifier also in signal receiving relationship with said feedback circuit, and
    a first proportional controller controllably connected to said servomotor and in signal receiving relationship with said first differential amplifier.

11. The machine tool according to claim 10 wherein said control means further includes a control adjustment means operably connected to output an adjustment signal to a second differential amplifier,
    said second differential amplifier also in signal receiving relationship with said load sensor, and
    a second proportional controller in signal receiving relationship with said second differential amplifier wherein said second differential amplifier and second proportional controller are operably disposed between said first differential amplifier and said load sensor.

12. The machine tool according to claim 9 wherein said hydraulic means further comprises;
    a hydraulic supply line connected to a high pressure chamber of said hydraulic cylinder,
    a hydraulic return line connected to a low pressure chamber of said hydraulic cylinder,
    said accumulator operably disposed in said supply line, and
    an accumulator unload valve operable to open at a preset pressure differential across said unload valve wherein said unload valve is operably disposed between said accumulator in said supply line and said return line.

13. The machine tool according to claim 12 wherein said hydraulic means further comprises;
    a hydraulic pump having an outlet wherein said supply line originates at said outlet and terminates at said high pressure chamber,
    a check valve disposed in said supply line between said outlet and said accumulator,
    said pump in hydraulic fluid communication with a hydraulic fluid reservoir wherein said return line originates at said low pressure chamber and terminates at said reservoir.

14. The machine tool according to claim 13 wherein said control means further includes;
- a motor current sensing feedback circuit connected to said servomotor,
- a first differential amplifier in signal receiving relationship with said load sensor,
- said first differential amplifier also in signal receiving relationship with said feedback circuit, and
- a first proportional controller controllably connected to said servomotor and in signal receiving relationship with said first differential amplifier.

15. The machine tool according to claim 14 wherein said control means further includes a control adjustment means operably connected to output an adjustment signal to a second differential amplifier,
- said second differential amplifier also in signal receiving relationship with said load sensor, and
- a second proportional controller in signal receiving relationship with said second differential amplifier wherein said second differential amplifier and second proportional controller are operably disposed between said first differential amplifier and said load sensor.

* * * * *